United States Patent [19]
Turgeon et al.

[11] Patent Number: 6,015,106
[45] Date of Patent: Jan. 18, 2000

[54] APPARATUS FOR CONTROLLABLY BREAKING HOLLOW SPHERES

[75] Inventors: Thomas A. Turgeon, Fridley; David J. Colburn, South St. Paul; Christopher R. Yungers, St. Paul, all of Minn.

[73] Assignee: 3M Innovative Properties Company, St. Paul, Minn.

[21] Appl. No.: 09/145,000

[22] Filed: Sep. 1, 1998

[51] Int. Cl.⁷ .................................................. B02C 19/12
[52] U.S. Cl. ................................................................ 241/69
[58] Field of Search ................................................ 241/69

[56] References Cited

U.S. PATENT DOCUMENTS

| | | | |
|---|---|---|---|
| 2,639,096 | 5/1953 | Hinerfeld | 241/69 |
| 2,672,075 | 3/1954 | Fraser | 241/69 |
| 4,211,537 | 7/1980 | Teitel . | |
| 4,302,217 | 11/1981 | Teitel . | |
| 4,303,432 | 12/1981 | Torobin . | |
| 4,328,768 | 5/1982 | Tracy et al. . | |

FOREIGN PATENT DOCUMENTS

| 1006197 | 4/1957 | Germany | 241/69 |
|---|---|---|---|

| WO 98/21772 | 5/1998 | WIPO . |
|---|---|---|

OTHER PUBLICATIONS

P.C. Souers, et al., "Fabrication of the Glass Microballoon Laser Target", Report No. UCRL–51–609, Lawrence Livermore Laboratory, Jul. 12, 1974.

Michael Monsler et al., "Glass Microshell Parameters for Safe Economical Storage and Transport of Gaseous Hydrogen", Fuel Cells for Transportation TOPTEC meeting, Alexandria, VA., Apr. 1, 1996.

*Primary Examiner*—Mark Rosenbaum
*Attorney, Agent, or Firm*—Douglas B. Little

[57] ABSTRACT

Apparatus controllably breaks hollow spheres stored in an enclosure. A first screen is disposed within the enclosure on a screen support. The screen has holes that are no larger in mesh size than the smallest hollow spheres. The screen support provides support to the first screen and has void areas to allow debris from broken spheres to pass through. An impeller is in contact with the first screen such that movement of the impeller across the first screen breaks the hollow spheres in contact with the first screen.

15 Claims, 8 Drawing Sheets

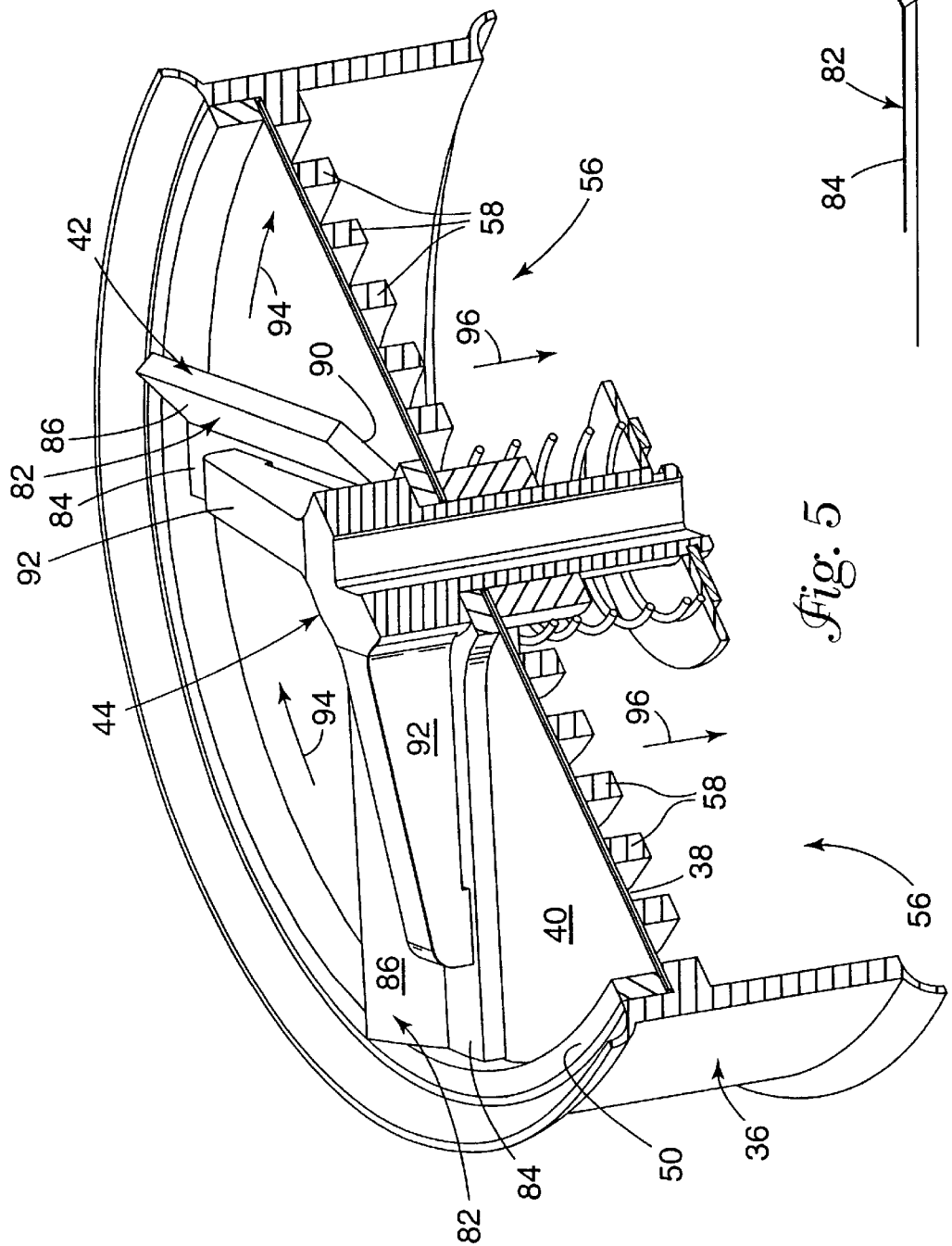
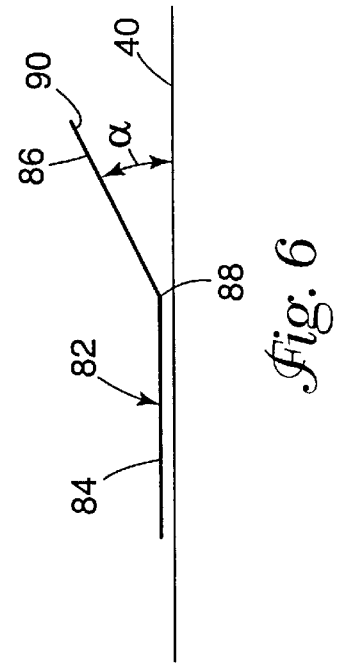
Fig. 5
Fig. 6

1

APPARATUS FOR CONTROLLABLY BREAKING HOLLOW SPHERES

This invention was made with Government support under Agreement No. NMA202-97-9-1050 awarded by the National Imagery and Mapping Agency. The Government has certain rights in the invention.

TECHNICAL FIELD

The present invention relates to an apparatus that breaks hollow spheres, and in particular, it relates to an apparatus in which the hollow spheres are stored and from which a substance stored in the hollow spheres is then released when the hollow spheres are broken.

BACKGROUND

It is well known in the art to store oxidizable gases for use as fuel in pressurized bulk containers or tanks. Such gases include hydrogen. Hydrogen can also be stored in bulk-lots of glass microbubbles (microspheres) as a fuel delivery system for automotive combustion engines wherein the hydrogen is released by diffusion when the glass microbubbles are heated, allowing the microbubbles to be refilled. U.S. Pat. Nos. 4,328,768, 4,211,537, and 4,302,217. Glass microbubbles can be filled with and retain hydrogen at pressures exceeding 41.4 MPa (6000 psig) for long periods of time. P. C. Souers, R. T. Tsugawa and R. R. Stone, "Fabrication of the Glass Microballoon Laser Target," Report No. UCRL-51-609, Lawrence Livermore Laboratory, Jul. 12, 1974; and Michael Monsler and Charles Hendricks, "Glass Microshell Parameters for Safe Economical Storage and Transport of Gaseous Hydrogen," presented Apr. 1, 1996, at the Fuel Cells for Transportation TOPTEC meeting, Alexandria, Va.

Published PCT application WO 9821772 discloses storing such microbubbles in a container. The microbubbles are broken to release the hydrogen which is expelled from the container through an exit port. The container includes a flat rotating blade to push the microbubbles against a screen which acts as a fracturing means. The screen has a mesh size smaller than at least 95% of the size of microbubbles. The blade is canted with respect to the screen to entrap microbubbles and force the microbubbles against the screen to cause fracturing. The debris from the microbubbles falls into and is collected in a removable bottom portion of the container. The gas which is produced upon rupturing of the microbubbles exits through an exit port and is filtered through a filter housing.

DISCLOSURE OF INVENTION

The present invention includes an apparatus for controllably breaking hollow spheres. The apparatus includes an enclosure and a first screen within or at one end of the enclosure. The screen has holes that are smaller in mesh size than the smallest hollow spheres. A screen support is provided for supporting the first screen and has void areas to allow debris from broken spheres to pass through. An impeller is disposed in the enclosure in contact with the first screen such that movement of the impeller across the first screen breaks hollow spheres that are on the first screen.

The impeller preferably includes at least one blade having a leading edge shaped so that the hollow spheres are trapped between the leading edge and the first screen and crushed or fractured. There are a variety of suitable shapes such as a beveled edge that engages the hollow spheres against the first screen. Other suitable leading edge shapes are curved shapes (e.g. a leading edge which in profile is like a round, or compound curve) and edge extensions forming an acute angle with the first screen.

BRIEF DESCRIPTION OF THE DRAWINGS

FIG. 5 is a perspective cross-sectional view of the grinder assembly.

FIG. 6 is a schematic view of the angle between an impeller blade of the present invention and a fracturing screen.

DETAILED DESCRIPTION

Figure 1:
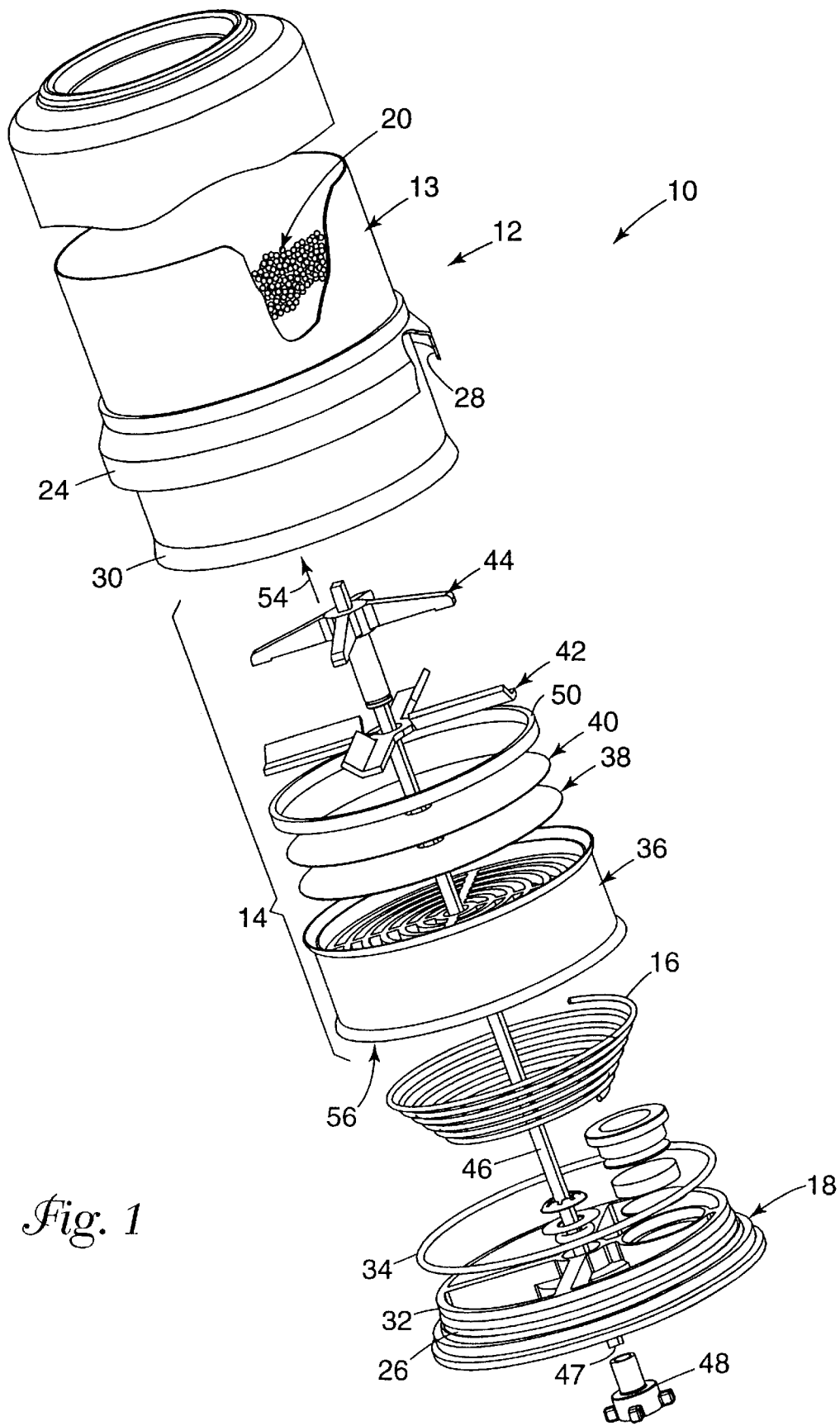
FIG. 1 is an exploded perspective view of a preferred embodiment of the present invention.

A preferred embodiment of a fuel pack apparatus of the present invention is generally illustrated as 10 in FIG. 1. The fuel pack apparatus 10 safely stores and controllably releases on demand an oxidizable gas such as hydrogen. When the hydrogen is spent, the fuel pack apparatus 10 can be recycled since it can be made of recyclable materials.

Figure 2:
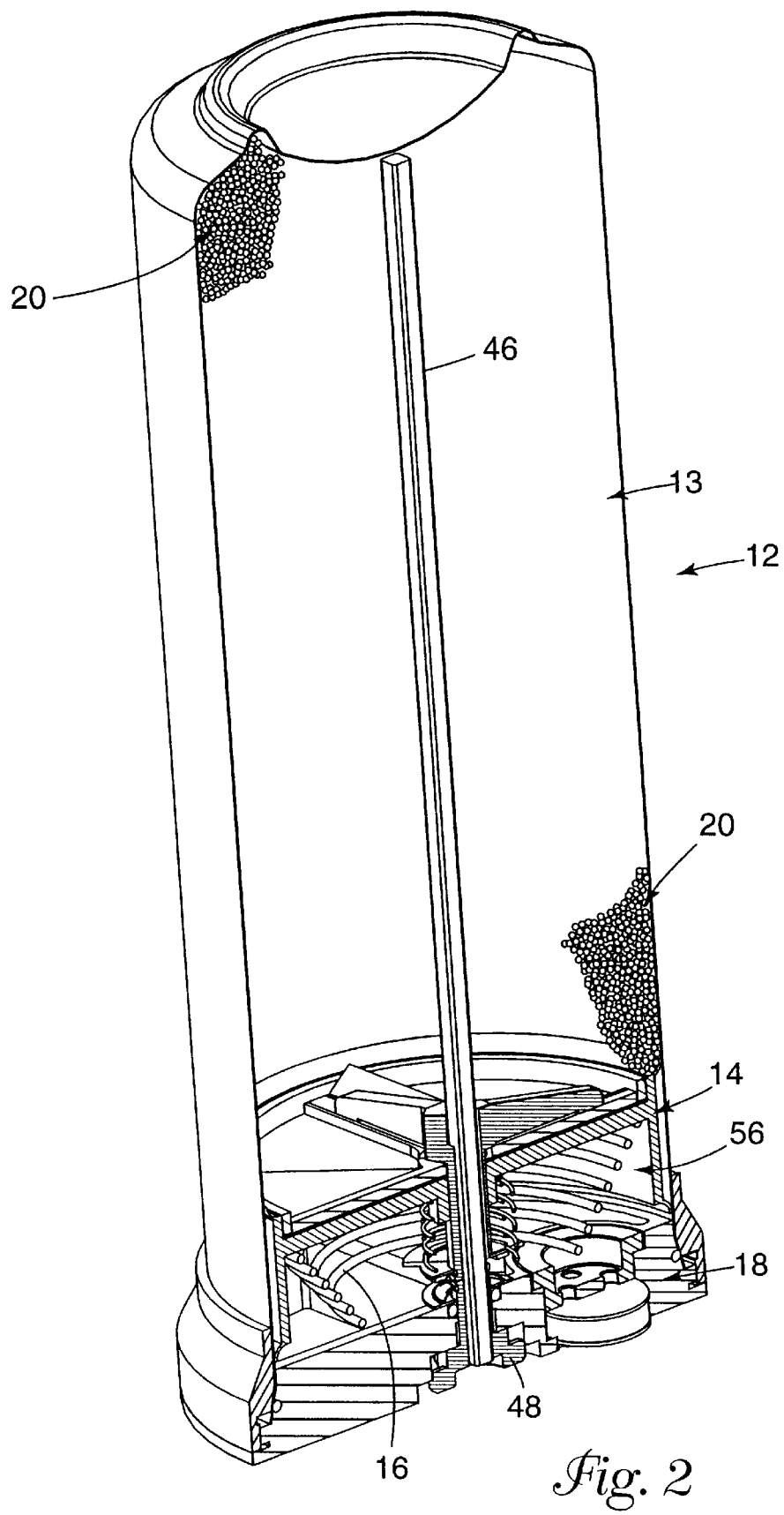
FIG. 2 is a cross-sectional elevation view of the present invention.

The fuel pack apparatus 10 of the present invention preferably stores hydrogen contained within glass hollow microspheres 20 that are disposed within a housing 13 that is attached to an end cap assembly 18 to form an enclosure 12, as illustrated in FIG. 2. For purposes of this invention, the terms microsphere and microbubble are used interchangeably. The glass microspheres are preferably approximately 20 to 85 micrometers in size. Preferably, the glass microspheres are filled with hydrogen under substantial pressure such as 24 MPa (3500 psi). Although reference to a gas is made within this application, it is to be understood that the apparatus of this invention may also be used to contain and deliver a liquid. Microspheres useful for the present invention are made of soda-lime-borosilicate glass which can be obtained from Minnesota Mining and Manufacturing of St. Paul, Minn. Preferably, the microspheres are spherical or spheroidal in shape to withstand maximum internal pressures. Other shapes that can withstand the same internal pressures are includable within the present invention. An important feature is that the microsphere is breakable by the apparatus 10 described herein. In addition, the material must have negligible permeability at working or useful temperatures to contain the gas or liquid within the microsphere and be highly permeable to the gas or liquid at the temperature of filling.

Figure 3:
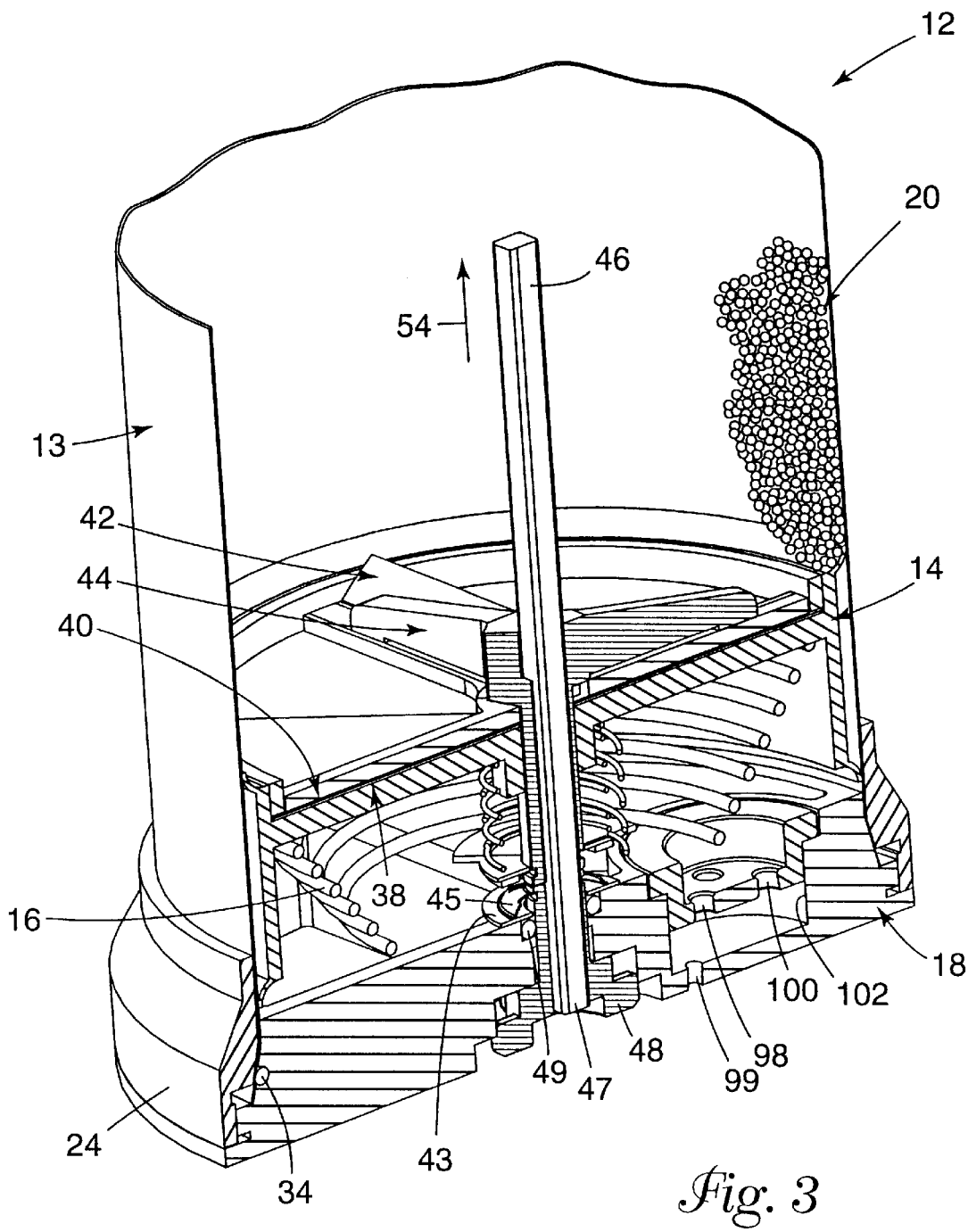
FIG. 3 is an enlarged fragmentary cross-sectional view of the area encircled in FIG. 2.

A major portion of housing 13 contains microspheres 20. Housing 13 is preferably characterized as:

1. being capable of holding a relatively low internal pressure of at least about 6 KPa preferably 28 KPa (4 psi) when it is sealed to end cap 18;
2. being sufficiently stiff so that it does not obstruct the movement of grinder assembly 14 or impede the flow of microbubbles 20 toward fracturing screen 40;

3. having low permeability to hydrogen, so that significant loss of hydrogen through the housing wall is prevented during use of the inventive apparatus. Most of the hydrogen exiting fuel pack apparatus 10 should exit through exit port 99 (as shown in FIG. 3).

Optionally, housing 13 also provides protection against the entry of radiant energy to heat the contents of microbubbles 20 (e.g. by reflection). The housing also is preferably made to be readily crushable when it is empty. The force to crush the empty housing would be relatively low, e.g. in the range of greater than 0 to 30 pounds force (>0–134 Newtons). Suitable materials of construction for the housing are aluminum and plastics such as polyethylene terephthatate coated with aluminum.

Housing 13 and the end cap 18 are secured to each other through a retaining ring 24. End cap 18 includes exterior threads 26 that threadably engage interior threads 28 of retaining ring 24, as illustrated in FIG. 1, thereby forming enclosure 12 and sealing its interior from the environment. Housing 13 has an outwardly flared annular end portion 30 that conforms to a cooperating beveled surface 32 on end cap 18 and is retained against that cooperating surface 32 by retaining ring 24 frictionally impinging on housing 13. O-ring 34 is positioned between retaining ring 24 and end cap 18 providing an airtight seal, as illustrated in FIG. 3.

Figure 4:
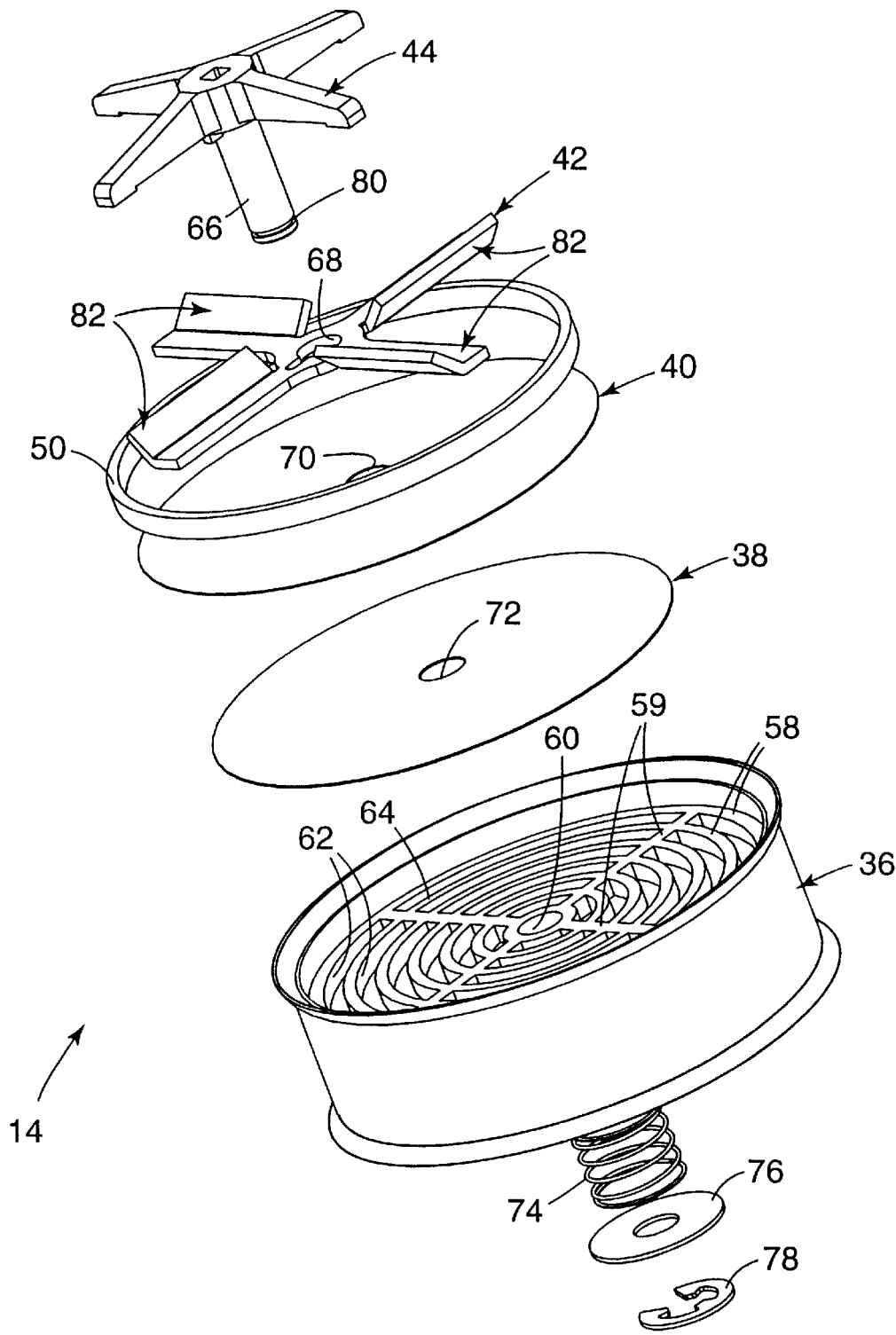
FIG. 4 is an exploded perspective view of a grinder assembly of the present invention.

Grinder assembly 14 is disposed within enclosure 12 and as best illustrated in FIG. 4 includes screen support 36, support screen 38, sphere fracturing screen 40, impeller 42 and impeller driver 44. Grinder assembly 14 as illustrated in FIG. 1 is centered about drive shaft 46 that extends through the grinder assembly and positively engages impeller driver 44 for turning impeller driver 44 which in turn turns impeller 42, as illustrated in FIG. 4. Drive shaft 46 is powered by an external power source (not shown) that engages a coupler 48 fixedly attached to end 47 of drive shaft 46. Although it is not evident from the view shown in FIGS. 2 and 3, the hole in coupler 48 that engages drive shaft 46 is a blind hole that does not allow gas to escape. Coupler 48 passes through end cap 18 and is held in place by washer 43 and retaining ring 45, as illustrated in FIG. 3. O-ring 49 provides a gas and sphere fragment seal. Drive shaft 46 extends the full length of housing 13. Grinder assembly 14 slides along drive shaft 46 and against an inside surface of housing 13 in the general direction of arrow 54.

Grinder assembly 14 provides a separation between microspheres 20 and storage area 56 in which broken microspheres can be stored. Storage area 56 is located on a side opposite from the area in which intact microspheres 20 are stored. Storage area 56 increases in size as the grinder assembly moves along drive shaft 46 to accommodate the growing number of sphere fragments that are created as microspheres 20 are broken. The area in which the microspheres are stored is diminished as progressively more microspheres are broken.

Tapered coil spring 16 in compression biases the grinder assembly against microspheres 20 by providing a biasing force that moves grinder assembly 14 along drive shaft 46 in the general direction indicated by arrow 54 as described previously. Spring 16 is positioned between grinder assembly 14 and an inside surface of end cap 18. Other types of springs and other means within the skill of the art that can provide the driving force to move grinder assembly 14 toward stored microspheres 20 are also included within the present invention.

Sphere fracturing screen 40 has a mesh size sufficiently small enough such that the screen's holes are no larger in mesh size than the smallest microsphere. Preferably, when the microspheres are 25 to 85 micrometers in size, a screen mesh size of 20–25 micrometers is preferred with a screen mesh size of 25 micrometers being most preferred. The term "mesh size" as used herein means the nominal size of the holes or openings in the screen or sieve which should be sufficiently large to permit a microsphere of the specified size to pass through. For example, a 25 micrometer mesh size will permit a 25 micrometer microsphere to pass through. The term "mesh" is a designation for screen or sieve openings known in the art.

Support screen 38 has a mesh size larger than that of fracturing screen 40, sufficient to allow debris from broken spheres to pass through the support screen. The mesh size of support screen 38 must also be sufficiently small to provide the stiffness required to prevent dimpling of the first screen when the impeller moves across fracturing screen 40 to break microspheres 20. The term "dimpling" means the deformation of the fracturing screen 40 which is caused by insufficient support to screen 40 when microspheres 20 are pressed against screen 40 by the impeller and not broken. A dimpled fracturing screen is characterized by visually perceptible areas that include intact microspheres lodged in the screen.

Screen support 36 is of a size and strength that provides support to first screen 40 and to screen 38 so that movement of the impeller across first screen 40 results in breakage of microspheres 20. When such a support is used, it is the combination of support 36 with the screens 40 (and 38 etc. if used) that prevent substantial dimpling of the first screen 40. Screen support 36 preferably has concentric support rib members 58 that are concentrically disposed to aperture 60 and radially extending rib members 59 that extend radially from aperture 60 to form a support surface 64 for both support screen 38 and fracturing screen 40. Disposed between the rib members 58 and 59 are void areas 62 that allow debris from broken microspheres to pass through into storage area 56. Patterns for the surface of screen support 36 other than that shown in FIGS. 4 and 5 (e.g. a honeycomb pattern) may be used. Preferably, the screen support has enough void area to allow passage of broken material to prevent plugging of fracturing screen 40 while it also has enough structure to support fracturing screen 40 and any support screens 38 if they are used. In the present preferred embodiment, at least approximately 50% of the major surface of the support is void area.

Grinder assembly 14 is held together as a unit by shaft member 66 of impeller driver 44 extending through aperture 68 in impeller 42, aperture 70 in fracturing screen 40, aperture 72 in support screen 38, and aperture 60 in screen support 36 through coil spring 74 in compression, washer 76 and engaged by E-type retaining ring 78 that engages annular slot 80 disposed at a distal end of drive shaft member 66. Spring 74 provides a force that biases the impeller against fracturing screen 40. Retaining ring 50 holds in place fracturing screen 40 and support screen 38 preventing the screens from rotating. Fracturing screen 40 is held in contact with stored microspheres 20 by action of coil spring 16.

Impeller 42 includes a plurality of blades 82 extending radially outwardly from the impeller's center as illustrated in FIG. 5. The blades are shown straight but can be swept forward or backward with a variety of different shapes. Four blades 82 are specifically shown, but any number of blades, or even a single blade may be used. Each blade 82 has a substantially flat screen engaging section 84 and a beveled section 86 which meet to form edge 88 that runs along the length of both sections 84 and 86 radially from the center of the impeller. Edge 88 contacts fracturing screen 40 or comes close enough to fracture microbubbles pocketed in the screen openings as the impeller turns. Lower surface 90 of beveled section 86 forms an acute angle α with fracturing screen 40 as best illustrated in FIG. 6. The acute angle is preferably in the range of approximately 1° to 70°. In the preferred embodiment, the angle is approximately 45°.

Shaft 46 engages the impeller driver 44. Impeller driver 44 includes a plurality of radially extending veins 92 that engage corresponding substantially flat sections 84 of the impeller blades thereby retaining the impeller blades 82 in contact with the fracturing screen 40. Lower surfaces 90 of blades 82 engage the microspheres that are disposed adjacent fracturing screen 40.

It is believed that fracturing screen 40 retains microspheres 20 by a pocketing action that holds the microsphere in place as surface 90 of the blade engages the microsphere. Pocketing of the microspheres occurs due to the relationship between the mesh size of fracturing screen 40 and the size of microspheres 20. The screen openings are large enough to hold most of the intact microspheres without allowing them to pass through the screen. Microspheres 20 are broken due to a combination of high pressure within the microspheres, the brittle material of which the microspheres are made, and the "pocketing" of the microspheres on fracturing screen 40. As the microspheres are held or pocketed by fracturing screen 40, they are fractured as the impeller blades rotate in the general direction of arrow 94 through the mass of microspheres and over the screen surface pushing the microspheres down into the screen openings and placing them under mechanical stress (e.g. shear and/or compressive stress). The broken fragments of microspheres then are pushed through or fall through fracturing screen 40, support screen 38 and screen support 36 as indicated by arrows 96 into storage area 56.

As the microspheres are broken, hydrogen gas is released within enclosure 12. In one working embodiment, the enclosure is under only 4 psi (28 KPa) pressure providing a safe storage container for a highly oxidizable gas. Hydrogen is released only upon demand and is allowed to escape from the enclosure through gas/particle filter assembly 98 and exit port 99 as illustrated in FIG. 3. Assembly 98 includes filter cap 100 that is press fitted into opening 102 of end cap 18. Filter cap 100 includes activated charcoal held between two layers of particle containment material (not shown) which functions as a gas and particle filter. The gas is filtered to retain any broken glass fragments within enclosure 12 and to remove undesirable gases from the flow stream, and the hydrogen gas is conveyed through tubing (not shown) for subsequent use.

Figure 7:
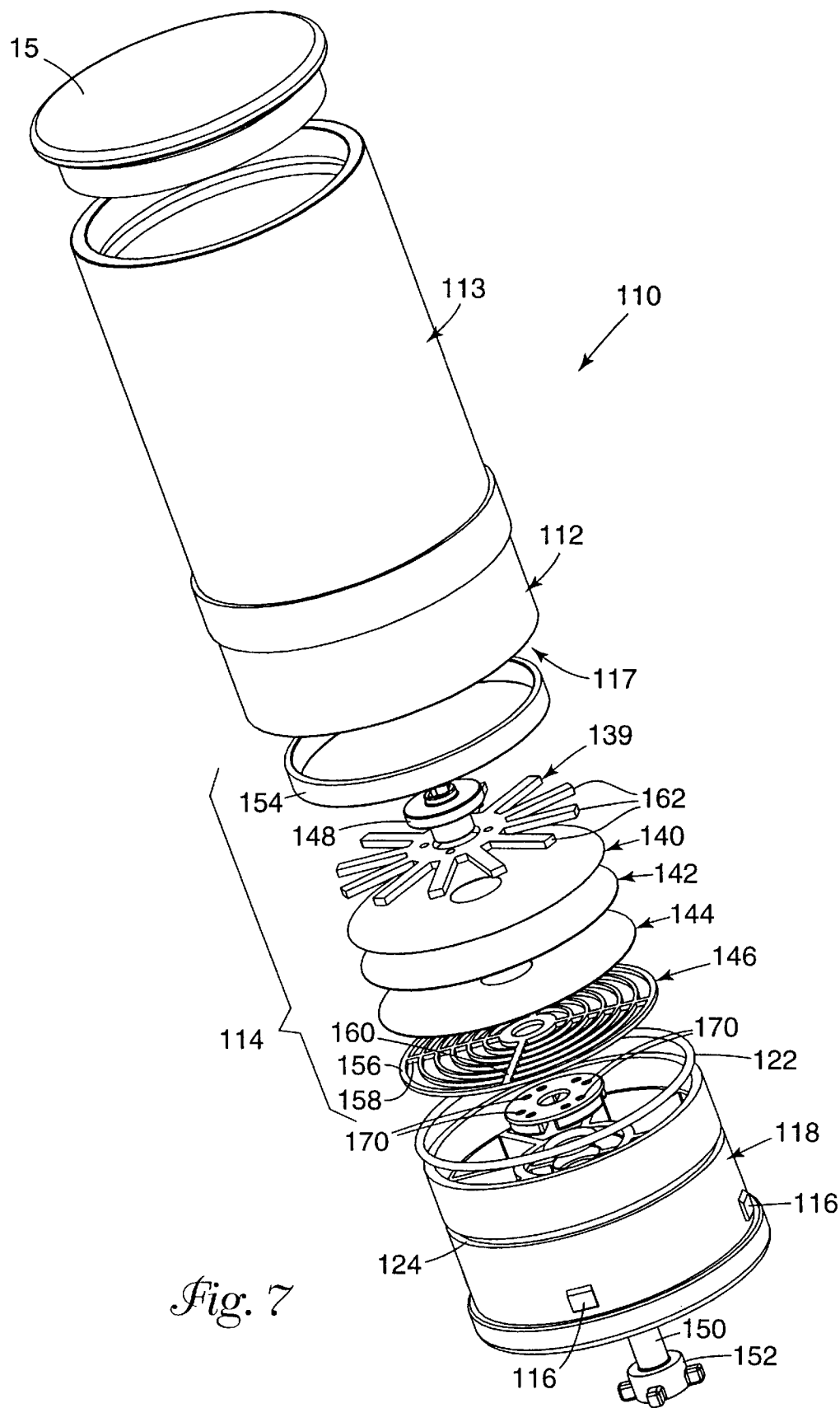
FIG. 7 is an exploded perspective view of an alternative embodiment of the present invention.
Figure 8:
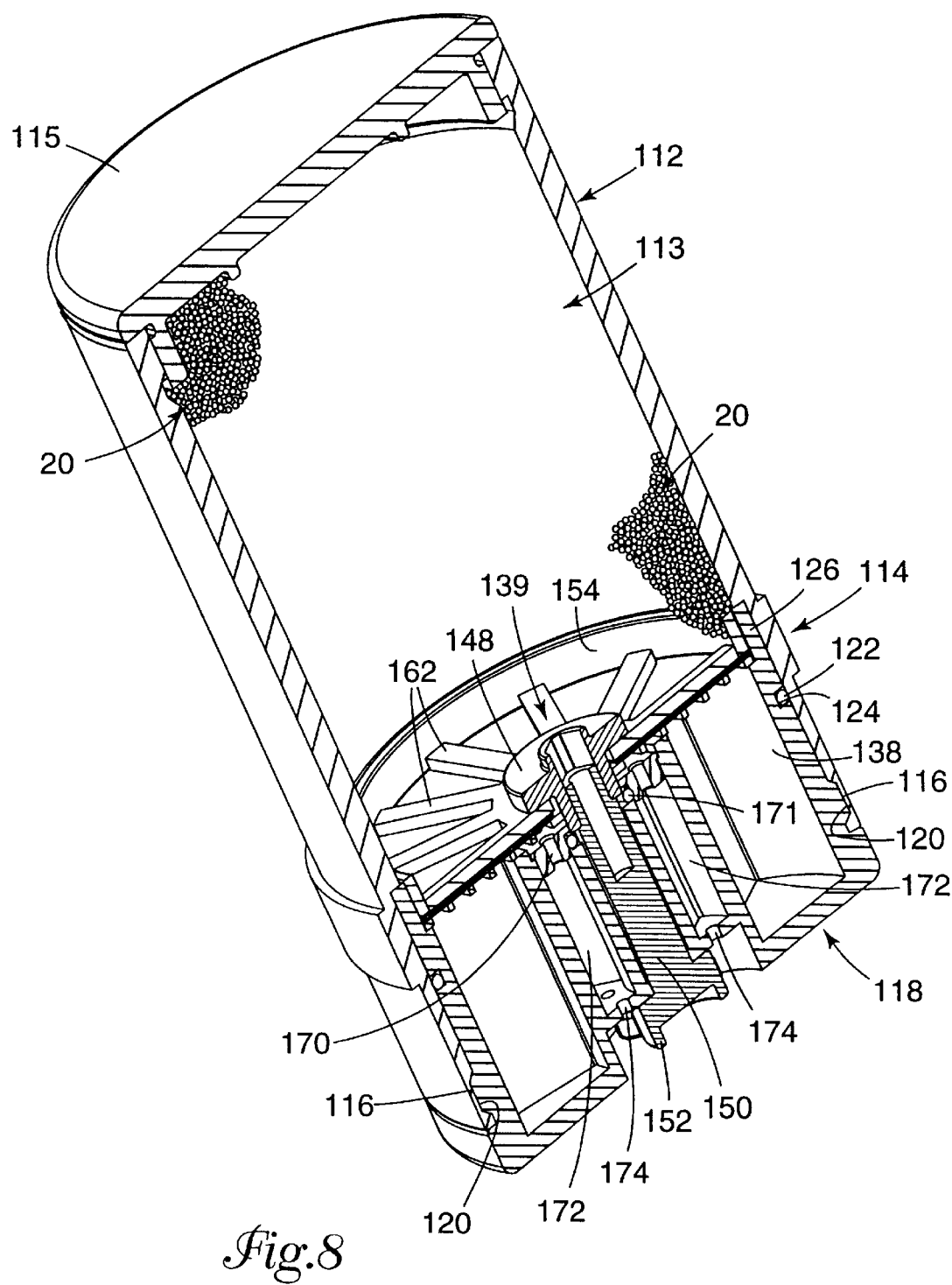
FIG. 8 is a perspective cross-sectional view of the embodiment of FIG. 7.

An alternative embodiment of the inventive fuel pack is apparatus 110 illustrated in FIGS. 7 and 8. Similar to embodiment of FIGS. 1–6, apparatus 110 includes enclosure 112 for storing microspheres 20 as illustrated in FIG. 8. Apparatus 110 also includes a grinder assembly 114 for fracturing microspheres 20. Apparatus 110 differs from the embodiment of FIGS. 1–6 in that the grinder assembly does not move axially along a drive shaft. Instead, the microspheres are gravitationally fed to the grinder assembly 114, or they can be forcibly directed toward the screen by use of a pushing means (within the skill of the art) for pushing or driving a mass within a cylinder toward one end of the cylinder. Such pushing means may be, for example, a plunger driven by a compressed spring, a piston driven by a fluid under pressure, or a ratchet mechanism. Such a pushing means would avoid reliance on gravity to direct the microspheres toward the grinder assembly.

Enclosure 112 includes housing 113 and end cap assembly 118. Housing 113 contains microspheres 20. Housing 113 is preferably crushable as the term crushable is defined with respect to FIGS. 1–6. To form enclosure 112, end cap 118 is inserted into proximal open end 117 of housing 113. Housing 113 and end cap 118 are attached by four concentrically positioned protruding tabs 116 of end cap 118 that engage respective slots 120 disposed on the inside surface of housing 113, as best illustrated in FIG. 8. O-ring 122 positioned within annular slot 124 in end cap assembly 118 provides a gas seal.

Grinder assembly 114 is stationarily positioned along a longitudinal axis of enclosure 112 within upper end 126 of the end cap assembly. Grinder assembly 114 provides a separation between stored microspheres 20 in housing 113 and storage space 138 for storing broken fragments of the microspheres. Since grinder assembly 114 is positioned stationarily within enclosure 112, the space for storing microspheres 20 and space 138 for storing fragments of broken microspheres is neither diminished nor increased in size as the microspheres are broken.

Grinder assembly 114, as illustrated in FIG. 7, includes impeller 139, fracturing screen 140, first support screen 142, second support screen 144, and screen support 146 which are held together by impeller driver 148 being attached to drive shaft 150 that extends through centrally disposed apertures in the impeller, screens 140, 142, 144, and screen support 146. One or more small pins (not shown) on the bottom of impeller driver 148 engage the holes shown in impeller 139. Axial separation of impeller driver 148 from drive shaft 150 is prevented by a screw (not shown) which threads downward into the central hole in drive shaft 150. This holds the impeller blades against screen 140. Screen retraining ring 154 is pressed into end cap assembly 118 to prevent the fracturing screen from rotating when impeller 139 is turned. The impeller driver has a key (not shown) that engages a key slot (not shown) in the impeller for driving the impeller when drive shaft 150 is turned. Drive shaft 150 is connected to coupler 152 positioned exterior of enclosure 112.

Fracturing screen 140 is preferably from approximately 20–25 micrometers in mesh size and most preferably approximately 25 micrometers. The first support screen 142 is larger in mesh size than the fracturing screen (eg. having a nominal hole size of about 600 micrometers or 30 mesh) while the second support screen 144 has a larger mesh size than the first (eg. having openings of a nominal size of about 707 micrometers or 24 mesh as defined in ASTM E11-95). The screen support 146 can have a minimum of 50 percent open or void space on surface 156 that faces screens 140, 142, and 144. The screen support 146 as illustrated includes a plurality of differently sized concentric rib members 158 connected by outwardly extending radial rib members 160.

Impeller 139 includes a plurality of blades 162 which are similar in construction to blades 82 of FIGS. 1–6. Each blade 162 forms the same acute angle α with fracturing screen 140 as that illustrated schematically in FIG. 6.

As microspheres 20 are fractured, sphere fragments fall through the screens and the screen support into storage area 138. The released gas exits through gas exit holes 170 into filter 172, made primarily of activated carbon contained on both sides by filter containment material, and exits enclosure 112 through gas exit ports 174. O-ring 171 provides a seal between drive shaft 150 and housing 118.

Figure 9:
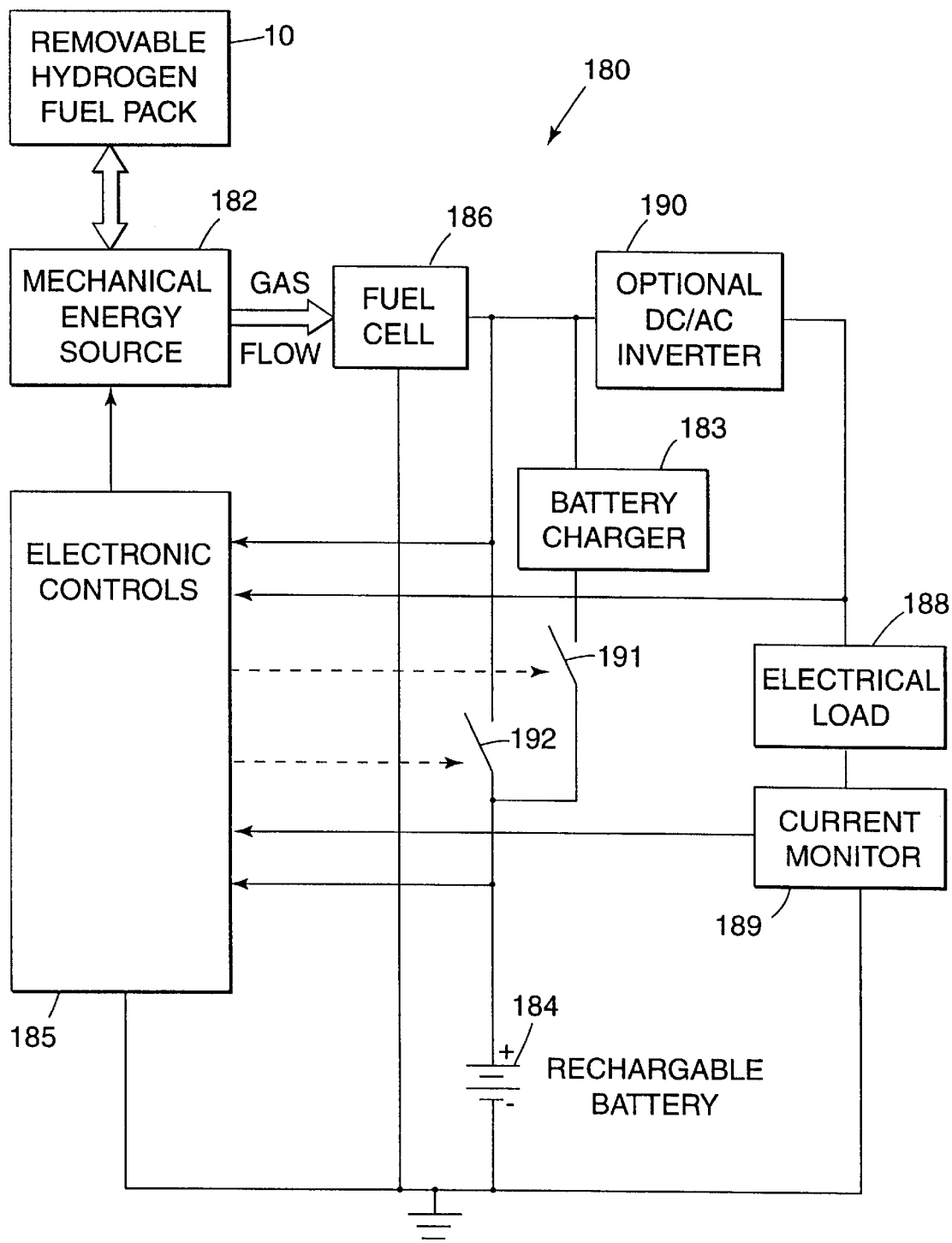
FIG. 9 is a schematic diagram of a portable power generator of the present invention.

Power generator 180 of the present invention is schematically illustrated in FIG. 9. The power generator includes fuel pack 10 or fuel pack 110 as described previously which is coupled to mechanical energy source 182 through coupler 48 or 152, respectively. Mechanical energy source 182 (e.g. a motor) turns the coupler and thereby turns the drive shaft of the fuel pack to fracture microspheres 20 within the fuel pack to liberate hydrogen gas under pressure. Mechanical energy source 182 can receive electrical energy from rechargeable battery 184.

Hydrogen gas flows from fuel pack 10 into fuel cell 186 which generates electricity from oxidation of the hydrogen gas. The electrical energy produced by the fuel cell recharges battery 184 thereby storing electrical energy and provides electrical current to electrical load 188. An optional DC/AC inverter 190 may be provided to convert the electrical energy output from the fuel cell to AC current for use at the load 188.

Suitable electronic controls 185 receive inputs from the rechargeable battery feed, current monitor 189, and fuel cell. As more or less electrical current is needed, the controls will increase or decrease the hydrogen flow by increasing current to the mechanical energy source driving the fuel pack. The current output of fuel cell 186 is directly related to hydrogen flow to the fuel cell from the fuel pack.

The electronic controls would actuate switch 191 while the fuel cell was operating, in order to charge rechargeable battery 184 by means of battery charger 183. To start the flow of hydrogen, switch 192 would be closed to furnish electrical current from the battery to the mechanical energy source. Although the details of the various components (such as the electronic controls) shown in FIG. 9 are not described, the specification and design of such components is within the skill of the art.

Control means 185 measures the output voltage of fuel cell 186 while providing current to electrical load 188. This voltage is compared to an internal reference voltage incorporated in control means 185. If the fuel cell voltage is less than the reference voltage, the mechanical energy source 182 is actuated by control means 185 to increase the output current of the fuel cell by increasing the flow of hydrogen. When the output voltage exceeds the reference voltage, the control means turns the mechanical energy source off which causes the output voltage to drop back toward the reference. This process repeats and will follow the variations in output current by modulating the on/off time of the mechanical energy source.

The power generator of FIG. 9 could be used to provide electricity in remote locations. The rechargeable battery can power external devices until the fuel cell is operating at capacity or can augment the output of the fuel cell.

A prototype of the inventive apparatus similar to that of FIGS. 7 and 8 was made, and the hydrogen gas output of the hydrogen fuel pack was coupled to an experimental fuel cell with a nominal output of 3 volts. The estimated efficiency of the fuel cell was approximately 50%. The inventive fuel pack contained approximately 75 milliliters of microbubbles containing hydrogen at 3500 psi (24 Mpa). The electrical output terminals of the fuel cell were connected to a portable compact disc (CD) player connected to a pair of small loudspeakers. The CD player and the loudspeakers dissipated approximately 2 watts of electrical power and ran on the fuel cell fuel pack combination for about two hours.

Although the present invention has been described with reference to preferred embodiments, workers skilled in the art will recognize that changes may be made in form and detail without departing from the spirit and scope of the invention.

What is claimed is:

1. An apparatus for controllably breaking hollow spheres comprising:

a) an enclosure;
 b) a first screen within or at one end of the enclosure having holes that are approximately no larger in mesh size than the smallest hollow spheres;
 c) a screen support providing sufficient support to the first screen to allow it to hold the hollow spheres while they are being broken and having void areas to allow debris from broken spheres to pass through;
 d) an impeller in close proximity to the first screen having a shape which causes the hollow spheres that are on the first screen to break as the impeller moves across the first screen; and
 e) a support screen disposed between the first screen and the screen support and having a mesh size larger than the first screen and sufficient to allow debris from broken spheres to pass through the support screen and constructed so that dimpling of the first screen when the impeller moves across the first screen to break the hollow spheres is substantially reduced or prevented.

2. The apparatus of claim 1 wherein the spheres are filled with a gas, the enclosure further comprises a gas exit port, and the enclosure has a permeability to the gas sufficiently low so that most of the gas exiting the apparatus exits through the gas exit port.

3. The apparatus of claim 1 further comprising a spring disposed within the housing to provide a force for positioning the first screen to contact the hollow spheres.

4. The apparatus of claim 1 wherein the hollow spheres are disposed in a section of the enclosure, and wherein that section of the enclosure is:

i) capable of holding at least about 6 KPa internal pressure when it is sealed;
 ii) sufficiently stiff so that it does not interfere with movement of the impeller or flow of the hollow spheres toward the first screen; and
 iii) readily crushed by a force between greater than 0 and 130 Newtons.

5. The apparatus of claim 1 wherein the enclosure includes a first storage section in which the hollow spheres are stored and a second storage section in which broken hollow spheres are stored and wherein the first screen, the screen support and the impeller are positioned between the first and second sections.

6. The apparatus of claim 5 wherein the impeller comprises at least one blade in contact with the first screen and wherein the blade has a flat portion closest to the first screen and a beveled portion, said flat and beveled portions forming an edge and said beveled portion forming an acute angle with the first screen.

7. The apparatus of claim 5 wherein the first screen, the screen support and the impeller are fixed along an axis of rotation of the impeller and the hollow spheres are kept in contact with the first screen by a pushing means.

8. The apparatus of claim 7 in which the pushing means is selected from gravity, spring loaded plungers, pistons driven by fluid under pressure, and a ratchet mechanism.

9. The apparatus of claim 1 in which the screen support has sufficient void area on its major surface so, that the first screen is not plugged during operation of the apparatus.

10. A hydrogen container comprising:

a) an enclosure containing hollow microspheres containing hydrogen at greater than atmospheric pressure;
 b) a first screen within or at one end of the enclosure in contact with the microspheres and having holes that are approximately no larger in mesh size than the smallest hollow microspheres containing hydrogen;

c) a screen support providing sufficient support to the first screen to allow it to hold the hollow microspheres while they are being broken and said screen support having void areas through which debris from broken microspheres can pass; and d) an impeller within the container in close proximity to the first screen having a shape which causes the hollow microspheres that are on the first screen to break as the impeller moves across the first screen.

11. The hydrogen container of claim 10 having an exit port connected to convey hydrogen to a fuel cell.

12. The apparatus of claim 10 wherein the particle size range of the microspheres is related to the screen opening size of the first screen such that the screen opening size is no greater than about the smallest particle size of the range, and the largest particle size in the range can be held, at least temporarily, in the screen openings.

13. The apparatus of claim 12 in which microspheres are in a particle size range of 20 to 85 micrometers, and the mesh size of the first screen is 20–25 micrometers.

14. An apparatus for controllably breaking hollow microspheres comprising:

a) an enclosure symmetrical about an axis of rotation;

b) a grinder assembly within the enclosure and moveable along the axis of the enclosure, said grinder assembly comprising:
  i) a first screen having holes that are approximately no larger in mesh size than the smallest hollow microspheres;
  ii) a screen support providing sufficient support to the first screen to allow it to hold the hollow microspheres while they are being broken and having void areas through which debris from broken microspheres can pass; and
  iii) an impeller in close proximity to the first screen having a shape which causes the hollow microspheres on the first screen to break as the impeller moves across the first screen; and c) a biasing means providing a force that moves the grinder assembly along the axis of the enclosure toward one end of the enclosure.

15. An apparatus for controllably breaking hollow microspheres comprising:

a) an enclosure;

b) a first screen within or at one end of the enclosure having holes that are approximately no larger in mesh size than the smallest hollow microspheres;

c) a screen support providing sufficient support to the first screen to allow it to hold the hollow microspheres while they are being broken and said screen support having void areas through which debris from broken microspheres can pass; and d) an impeller within the enclosure in close proximity to the first screen, said impeller having a shape which causes the hollow microspheres on the first screen to break as the impeller moves across the first screen and said impeller being biased against the first screen by a spring.

* * * * *